April 26, 1927.
C. E. GODLEY
1,626,406
FLUTED LAMP LENS
Filed May 6, 1926
2 Sheets-Sheet 1
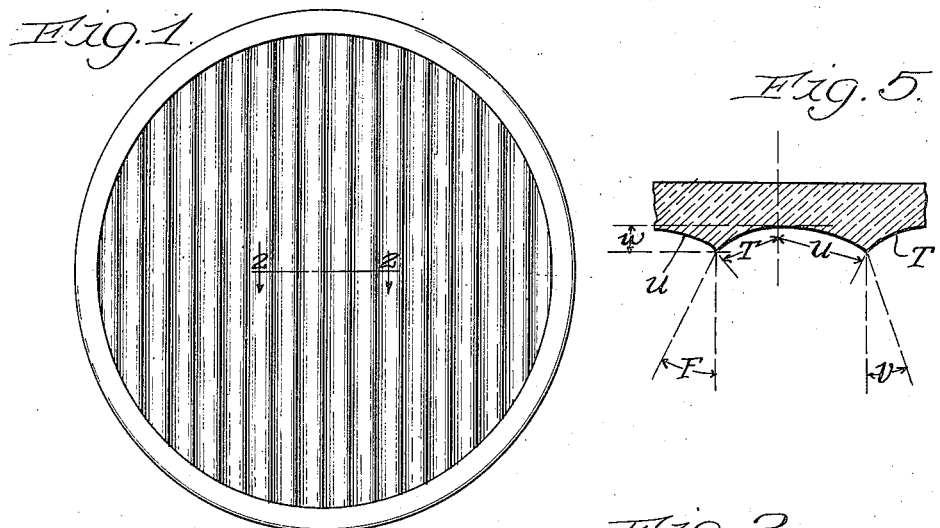
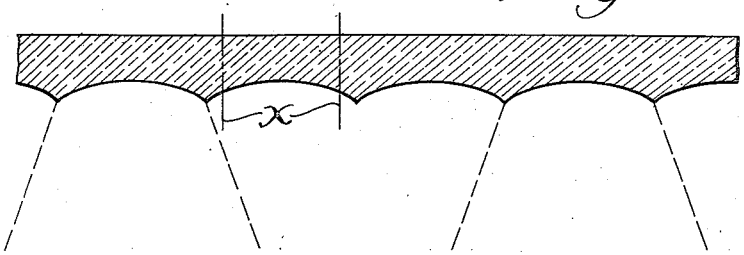
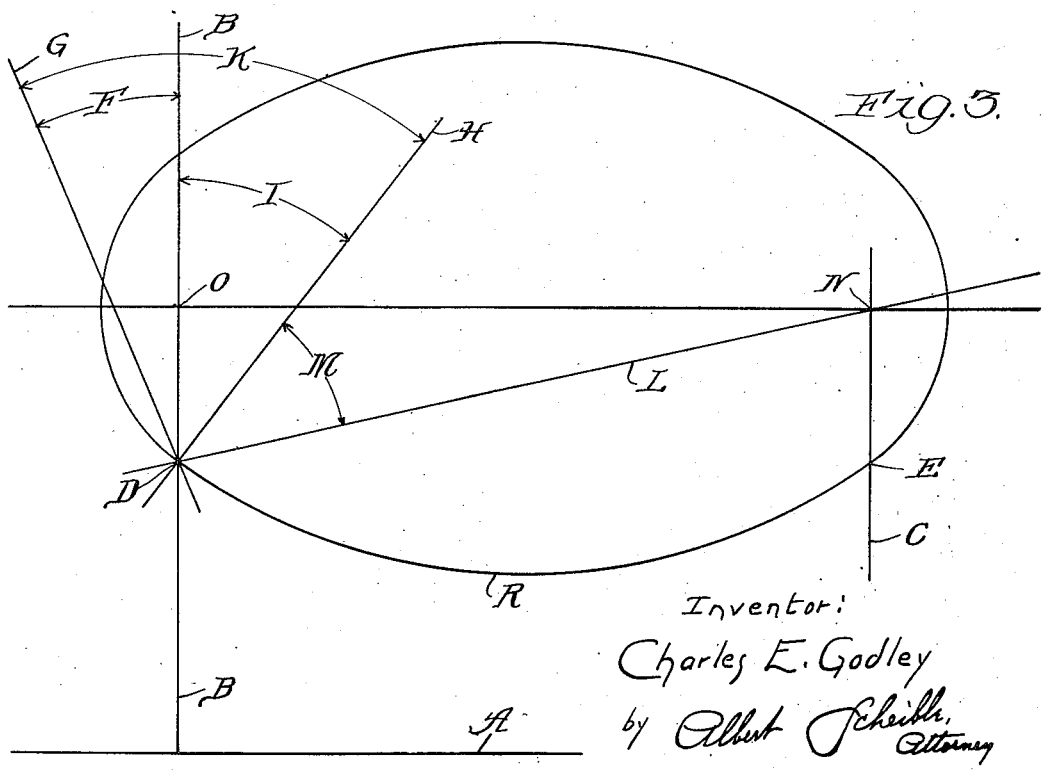
Inventor:
Charles E. Godley
by Albert Scheible,
Attorney

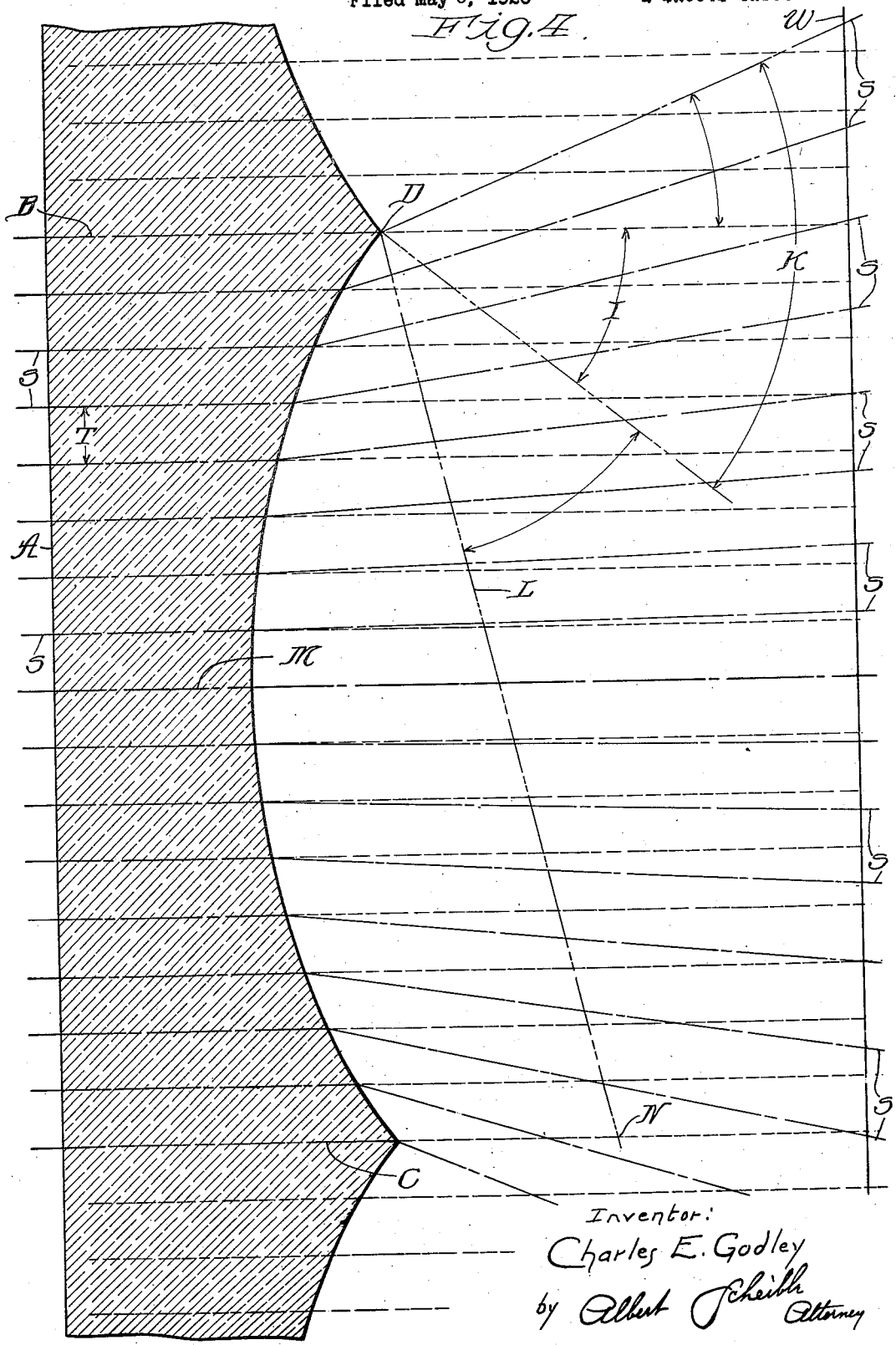

Patented Apr. 26, 1927.

1,626,406

UNITED STATES PATENT OFFICE.

CHARLES E. GODLEY, OF DETROIT, MICHIGAN, ASSIGNOR, BY MESNE ASSIGNMENTS, TO C. M. HALL LAMP COMPANY, A CORPORATION OF MICHIGAN.

FLUTED LAMP LENS.

Application filed May 6, 1926. Serial No. 107,096

My invention relates to fluted or grooved translucent light-transmitting elements, such as headlight lenses. Where light projected through a glass pane or lens is to spread along one general plane, it has long been customary to accomplish this spreading by making the rear face of the glass and providing the forward face with prisms or grooves extending transversely of the direction in which the light is to be spread.

In automobile headlights, forwardly convex formations on the lens are objectionable because the light is so refracted by the junctures of the consecutive prisms that dark streaks are left on the road. While these dark streaks can be avoided by providing the forward face of the lens with grooves having arcs of circles as their transverse sections, such grooved lenses have three objections, particularly when used in connection with light projected through the lens by an accurately formed parabolic reflector which has the source of light at its focus.

One of these objections lies in the irregular distribution of the projected light, which makes it necessary to select an approximately suitable groove radius by a long series of tests of different sections and which leaves a considerable portion of the light spread beyond the dispersive angle needed in an automobile headlight. Owing to the low candle-power of the lamp bulbs which are allowed to be used in such headlights, this waste of light should be avoided.

Another objection, which is more serious in practice, lies in the fact that vertical grooves of circular sections concentrate part of the light unduly at either side of the beam, thereby producing a pair of laterally spaced bright spots on the road. A third objection lies in the fact that such circular groove sections spread too large a percentage of the light at considerable angles from the vertical medial plane of the projected beam, thereby leaving an undesirably small proportion of the light in the direct path of the vehicle.

My present invention aims to overcome all of these objections by providing lens groove sections which have five distinct advantages; namely:

(1) Confining the projected light to definitely limited angles at each side of the medial vertical plane of the lens.

(2) Enabling the angular spread to be definitely and easily predetermined.

(3) Enabling the needed groove section to be easily and accurately predetermined for any desired angular spread.

(4) Avoiding both bright and dark spots or streaks on the road.

(5) Affording a projection of light on the road which gradually decreases from a maximum in the medial vertical plane of the beam to a minimum at the lateral edges of the beam.

Furthermore, my invention provides lens grooves for this purpose which will minimize the effect of rain on them.

Illustrative of my invention, Fig. 1 is a front view of a headlight lens grooved according to it and designed for refracting a light which is projected through the lens from the back of the lens in rays perpendicular to the flat rear face of the lens, so as to distribute the light within a definitely limited angle and with an intensity gradually decreasing in both directions laterally of the axis of the lens.

Fig. 2 is a fragmentary and enlarged section taken through the lens at right angles to the direction in which the grooves extend.

Fig. 3 is a diagram showing the method of determining the shape of the groove for a given maximum spread of light.

Fig. 4 is an enlargement of a portion of Fig. 2, with the lens reduced in thickness and with lines showing the refraction of the rays of light passing through spaced points, namely points spaced equally distant along the rear flat face of the lens along a line at right angles to the axis of the groove, and also showing the projection of rays along these lines against a screen parallel to the lens.

Fig. 5 is a fragmentary and enlarged horizontal section through a lens in which each groove comprises adjoined portions of different ellipse, so as to distribute the light within different angles at opposite sides of the medial vertical plane through the lens.

In accomplishing the purposes of my invention in the lens of an automobile headlight, I provide the front face of the lens with vertical grooves, each groove having a section which is a portion of an oval having its major axis substantially parallel to the flat rear face of the lens. To permit an exact predetermining of the angles within which the light is distributed at each side of the medial vertical plane of the beam, I preferably make one or more curve portions for this groove section, each portion being part of an ellipse which has its major axis parallel to the flat face of the lens.

Where the light is to be distributed symmetrically at both sides of the vertical medial plane of the projected beam, I make the entire groove section a part of a single ellipse and preferably employ the part of one side of the ellipse which is between the two loci lines at right angles through the major axis of the ellipse and extending respectively through the two foci of the ellipse, thereby facilitating the determining of the elliptical curvature for a given angle of light distribution.

Illustrative of the procedure in such a case, the diagram of Fig. 3 shows the staight line A as denoting a horizontal section through the flat rear face of the lens, with locus lines B and C extending at right angles to the line A and spaced by the desired width of the groove, while the points D and E are respectively spaced along the locus lines B and C at equal distances from the line A.

To determine a groove section which will give a maximum spread at opposite sides of the lines B and C corresponding to a desired limiting angle F, I draw a line G through the point D at the forwardly directed acute limiting angle F. I then draw another line H through the point D at such an angle I to the line B, and at the opposite side of the latter from the line G that the proportion between the angle I and the angle K (or the acute angle between the lines G and H) will be as 1 to the refractive index of the giass of which the lens is to be made. Thus, if the refractive index of the glass is 1.56, the angle I would be $\frac{1.56}{.56}$ or approximately 2.78 times the angle F.

The line H as thus located will be the disector of the angle formed by the straight lines B and L running through the point D on the desired ellipse to the two foci of the ellipse, hence I determine the line L by drawing it through D at an acute angle M equal to the angle I but at the opposite side of the line H from the latter angle. The intersection N of the line L with the other locus line C gives me one focus of the ellipse, so that an ellipse drawn with the points N and O as foci and with D as one point on the ellipse will have the desired curvature. In practice, the form of the ellipse can thus be determined on a greatly enlarged scale and afterwards reduced in its proportions to correspond to the desired actual widtn of the groove.

Owing to the above recited definite relationships, I can also readily calculate the maximum spread of light resulting from a groove which has as its curve section R the portion of a given ellipse between the locus lines B and C of that ellipse. To do this, I simply bisect the angle between one of the locus lines (such as B) and the line L running from the intersection of that locus line with the ellipse to the more distant focus N, thereby obtaining the line H. Multiplying the angle I (or acute angle between the lines B and H) by the refractive index of the glass, gives me the angle K at which light passing along the line B through the point D will be refracted away from the bisector (or normal) line H at this point D, hence this angle is easily figured so as to draw the line G at the calculated angle from the bisector or normal line H. Then the acute angle between the line G and the locus line B (or initial direction of the ray of light) shows the maximum lateral refraction of light at each side of the initial direction of the rays of light, or one-half the maximum angle of light dispersion.

With a lens groove having such an ellipse portion as its transverse section, Fig. 4 is a plotting of the rays of light passing through the lens at right angles to the rear face A of the lens. This shows that rays S spaced at equal distances along this rear face transversely of the groove are refracted at angles which increase gradually according to the increasing initial distance of these rays from the medial plane M of the groove. Since the initial spacings of the consecutive rays S were equal while the intersections of the refracted rays with a screen W disposed parallel to the rear face of the lens increase gradually at opposite sides of the medial plane M, the illumination of the screen is most intense along that medial plane and diminishes uniformly in opposite directions laterally of that plane. Hence my use of an elliptical groove section enables me to secure this laterally graduated distribution of light with an entire absence of streakiness and a definite predetermining of the angle of spread.

However, the groove section thus employed need not all be a part of a single ellipse, as I may use adjoined curve portions merging smoothly into each other and each forming part of an ellipse which has its major axis parallel to the flat rear face of the lens. For example, the groove section in Fig. 5 comprises a part T curved for distributing light within the angle F at one side of the axis of the beam, and a continuation part U designed for distributing light within a smaller angle V at the other side of this axis. In determining such a groove, the general shape of each ellipse (or proportion between the major and minor axes) is determined as heretofore recited, and one of these is reduced in dimensions as before, thereby determining the effective groove depth W, after which the other is reduced to give the same groove depth. Then the two reduced elliptical portions are adjoined at a point where they afford smooth continuations of each other.

With such an unsymmetrical groove section, as with the previously described symmetrical groove section, the intensity of the light is greatest near the medial vertical plane of the beam and decreases toward either side of the beam with such graduated uniformity as to eliminate streaks and spots on the road.

While, the width of such grooves could be varied greatly, I have found a decided difference in the effect of rain on such vertically grooved lenses, according as the grooves are more or less than about a quarter of an inch in width. With the groove more than a quarter of an inch wide, the average rain drop which strikes a single groove is spread laterally to such an extent that the capillary action overcomes gravity and causes the drop to adhere to the lens or at best to descend very slowly. On the other hand, if such an average rain drop strikes a groove which is not more than a quarter of an inch in width, this limited groove width will correspondingly restrict the proportion of the surface of the drop which engages the glass, so that the capillary action is insufficient to overcome the weight of the drop and the latter travels speedily down the groove. Hence my lens automatically and speedily sheds the rain drops when constructed with this maximum groove width, thereby greatly increasing the penetration of the beam of light and the safety of driving on rainy nights.

However, while I have illustrated my invention as embodied in a lens which has its entire light emitting face formed into vertical grooves, I do not wish to be limited to this embodiment, it being obvious that changes might be made without departing either from the spirit of my invention or from the appended claims. Nor do I wish to be limited to the use of such elliptically grooved glass as a portion of a headlight having a parabolic reflector.

I claim as my invention:

1. A lens for spreading light laterally within a limiting angle from the direction of parallel rays directed perpendicularly to the lens from the rear thereof; the lens having a face thereof provided with vertical grooves, the transverse section of each groove being a portion of an ellipse which has its major axis parallel to the rear lens face and its foci along the lines on which the said rays respectively reach the opposite edges of the groove, the ellipse being of such a curvature that the angle between the direction on which the ray reaching each groove section end along one of the said lines and the bisector of the angle between straight lines connecting the said end with the foci of the ellipse is equal to one half of the last named angle multiplied by the refractive index of the glass of which the lens is made.

2. For use in the lateral spreading of parallel horizontal rays, a lens having one face in a general plane at right angles to the said rays, the said lens face being provided with vertical grooves each having as its horizontal section that portion of a determining ellipse which is disposed at one side of the major axis of the ellipse and which is between the locus lines extending at right angles to the axis of the ellipse through the foci thereof; the major axis of the determining ellipse being horizontal and parallel to the said general plane; the determining ellipse being such that the acute angle between either of the said loci lines and the direction in which light is refracted from the point of the ellipse on that locus line is approximately fifty-six one-hundredths of the acute angle between the same locus line and a line normal to the ellipse at the same point.

3. A method of designing a transverse groove section for the face of a glass lens and having light directed to the lens in rays at right angles to the general plane of the said face, when the grooved lens portion is to refract rays within a limiting angle of deviation from the direction of the said rays transversely of the groove; the said method consisting of laying out end points spaced to correspond to the width of the groove, drawing locus lines at right angles to a line connecting the said end points; drawing a divergence line from the first of the said end points and outside the space between the locus lines at an acute angle to the locus line through the said first end point, which angle equals the said limiting angle; drawing a bisector line through the said first end point at the other side of the locus line from the divergence line and at an angle proportioned to the limiting angle in the ratio of 1 to the excess over unity of the refractive index of the glass of which the lens is to be made; drawing a focus line through the last named point and diverging from the last named locus line at an angle double that by which the bisector line diverges from the said locus line, and drawing an ellipse passing through the said end points and having its major axis parallel to the straight line connecting the end points, the ellipse having its foci respectively on the locus lines and having one focus at the intersection of the said focus line with the locus line passing through the other end point.

Signed at Detroit, Michigan, April 28th, 1926.

CHARLES E. GODLEY.